US012487128B2

(12) United States Patent
Lin et al.

(10) Patent No.: US 12,487,128 B2
(45) Date of Patent: Dec. 2, 2025

(54) ELECTRONIC DEVICE FOR MONITORING VEHICLE ENVIRONMENTS

(71) Applicant: Samsara Inc., San Francisco, CA (US)

(72) Inventors: Jennifer Lin, San Francisco, CA (US); Christian Almer, San Francisco, CA (US); Somasundara Pandian, San Francisco, CA (US); Wael Barakat, San Francisco, CA (US); Nathan Heinrich, San Francisco, CA (US); David Gal, Oakland, CA (US)

(73) Assignee: Samsara Inc., San Francisco, CA (US)

( * ) Notice: Subject to any disclaimer, the term of this patent is extended or adjusted under 35 U.S.C. 154(b) by 725 days.

(21) Appl. No.: 17/818,881

(22) Filed: Aug. 10, 2022

(65) Prior Publication Data

US 2024/0003749 A1   Jan. 4, 2024

Related U.S. Application Data

(60) Provisional application No. 63/367,593, filed on Jul. 1, 2022.

(51) Int. Cl.
*G01K 1/08* (2021.01)
*G01K 1/02* (2021.01)
(Continued)

(52) U.S. Cl.
CPC ............. *G01K 1/08* (2013.01); *G01K 1/024* (2013.01); *G01K 1/028* (2013.01); *G01K 1/16* (2013.01); *H05K 5/0026* (2013.01)

(58) Field of Classification Search
CPC .......... G01K 1/08; G01K 1/024; G01K 1/028; G01K 1/16; H05K 5/0026
See application file for complete search history.

(56) References Cited

U.S. PATENT DOCUMENTS 10,831,249 B2 * 11/2020 Jiang ...................... G06F 1/203
2010/0202623 A1 * 8/2010 Snider .................. H05K 9/0007
29/829

(Continued)

OTHER PUBLICATIONS

U.S. Appl. No. 17/817,961, filed Aug. 5, 2022, 53 pages.

*Primary Examiner* — Laura Martin
*Assistant Examiner* — Philip L Cotey
(74) *Attorney, Agent, or Firm* — Nicholson, De Vos, Webster & Elliott, LLP

(57) ABSTRACT

An electronic device is described to monitor a temperature of an ambient environment. The electronic device comprises an enclosure that defines an internal volume and a plurality of external surfaces. The enclosure comprises a thermal member exposed to the ambient environment at an opening defined through a first external surface. The thermal member has a greater thermal conductivity than other portions of the enclosure, which have a greater transmissibility of wireless signals than the thermal member. The plurality of external surfaces and the thermal member are disposed to prevent liquids from entering the internal volume. The electronic device further comprises a temperature sensor disposed in the internal volume, thermally contacted with the thermal member, and connected with wireless transmitter circuitry to wirelessly transmit measurements of the temperature of the ambient environment.

20 Claims, 11 Drawing Sheets

(51) Int. Cl.
  *G01K 1/024*   (2021.01)
  *G01K 1/16*   (2006.01)
  *H05K 5/00*   (2025.01)

(56) References Cited

U.S. PATENT DOCUMENTS

| | | | | |
|---|---|---|---|---|
| 2013/0039383 | A1* | 2/2013 | Jetter | A61B 5/14532 |
| | | | | 374/E3.001 |
| 2015/0124390 | A1* | 5/2015 | Koch | G06F 1/1633 |
| | | | | 361/679.55 |
| 2015/0211937 | A1* | 7/2015 | Hofer | G01K 7/42 |
| | | | | 374/208 |
| 2015/0214659 | A1* | 7/2015 | Thiel | H01R 13/639 |
| | | | | 439/341 |
| 2017/0184456 | A1* | 6/2017 | Chatterjee | G01K 1/16 |
| 2018/0341911 | A1* | 11/2018 | Daoura | G06Q 10/0833 |
| 2020/0256746 | A1* | 8/2020 | Lowry | G01K 13/08 |
| 2020/0408607 | A1* | 12/2020 | Yee | H05K 1/147 |
| 2021/0096004 | A1* | 4/2021 | Baker | G01D 11/245 |
| 2022/0412809 | A1* | 12/2022 | Moretti | G01K 7/16 |
| 2023/0243706 | A1* | 8/2023 | Simpkins | G01K 15/005 |
| | | | | 374/152 |
| 2023/0314190 | A1* | 10/2023 | Boretti | H05K 5/061 |
| | | | | 73/430 |

* cited by examiner

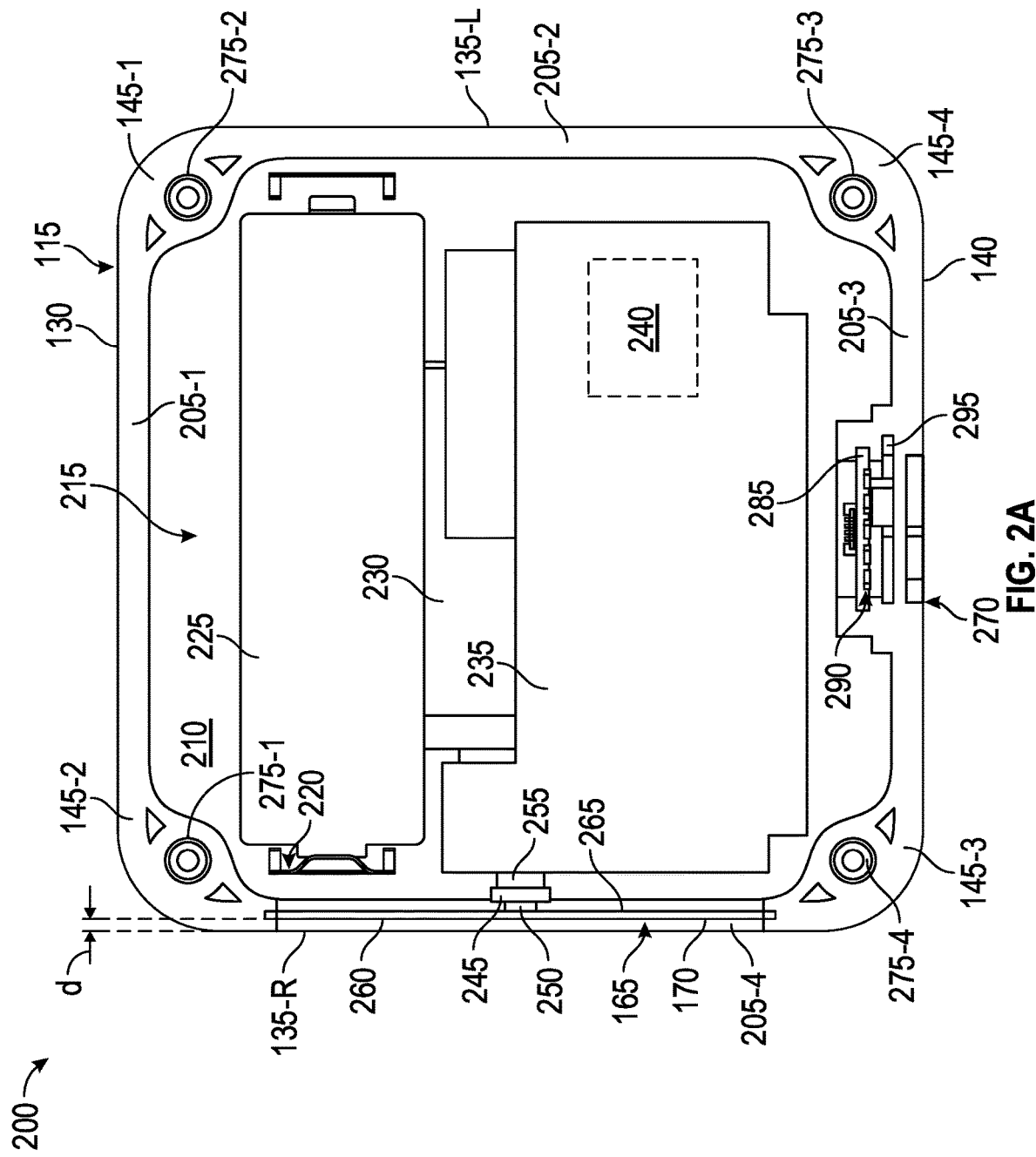

ELECTRONIC DEVICE FOR MONITORING VEHICLE ENVIRONMENTS

CROSS-REFERENCE TO RELATED APPLICATIONS

This application claims the benefit of U.S. Provisional Application No. 63/367,593, filed Jul. 1, 2022, which is hereby incorporated by reference in its entirety.

TECHNICAL FIELD

Embodiments described herein are directed to sensor-enabled electronic devices, and more specifically, to compact implementations of an electronic device that are particularly suitable for deployment in portable or movable platforms.

BACKGROUND ART

Vehicles are used for transportation of passengers and/or cargo, which in some cases may cover significant distances (e.g., hundreds or thousands of miles). The environmental parameters of one or more compartments of the vehicle may be monitored (sometimes in real-time) during a duration of the transport to ensure a suitable environment for the passengers and/or cargo being transported by the vehicle.

Some monitored compartments may be required to support relatively harsh environments, such as high humidity and/or high temperature, low temperature, and so forth. Various operations of the passenger and/or cargo transport (e.g., passengers embarking and disembarking from a passenger compartment, loading and unloading cargo from a cargo compartment) may require persons to transit the compartments. Further, other operations may be routinely or occasionally performed on the compartments of the vehicle, such as cleaning, repairing, and reconfiguring, that requires persons to transit the compartments.

BRIEF DESCRIPTION OF THE DRAWINGS

The following figures use like reference numbers to refer to like elements. Although the following figures depict various exemplary embodiments, alternative embodiments are within the spirit and scope of the appended exemplary embodiments. In the drawings:

FIG. 2A provides a rear view of a cover member of an exemplary enclosure of the electronic device, according to one or more embodiments.

DETAILED DESCRIPTION

Embodiments described herein are directed to compact implementations of an electronic device that may be used to monitor one or more parameters of an ambient environment, and to communicate wireless signals representative of the one or more parameters to one or more external electronic devices. The compact implementations and wireless connectivity of the electronic device support a simple and flexible deployment, removal, redeployment, etc. of the electronic device, and may be particularly suitable for deployment in portable or movable platforms, such as vehicles.

The electronic device includes an enclosure that houses one or more components that provide various functionality of the electronic device. In some embodiments, the enclosure prevents the ingress of liquids and/or particles into an internal volume of the enclosure. In some embodiments, the one on more components include one or more sensors disposed in the internal volume, such as a temperature sensor, that monitor one or more parameters of the ambient environment of the electronic device. For example, the electronic device may be deployed in a refrigerated cargo compartment of a truck or trailer, and temperature measurements may be acquired by the electronic device to ensure that desired conditions are maintained during transport of the cargo, e.g., to authenticate the quality of the cargo.

To improve the thermal responsivity of the electronic device (e.g., supporting greater sampling rates of the temperature of the ambient environment), the temperature sensor is thermally contacted with a thermal member that is exposed to the ambient environment. In some embodiments, the thermal member forms a portion of an external surface of the enclosure. In some embodiments, the thermal member comprises a metal material, such as aluminum. The electronic device may further include wireless transmitter circuitry that communicates wireless signals representative of the temperature measurements, and other portions of the enclosure have a greater transmissibility of the wireless signals than the thermal member. For example, the other portions of the enclosure may comprise a plastic material. In some embodiments, the thermal member may be included in a side surface of the enclosure, and the wireless transmitter circuitry is disposed away from the side surface, such as closer to an opposing side surface of the enclosure.

Figure 1A:
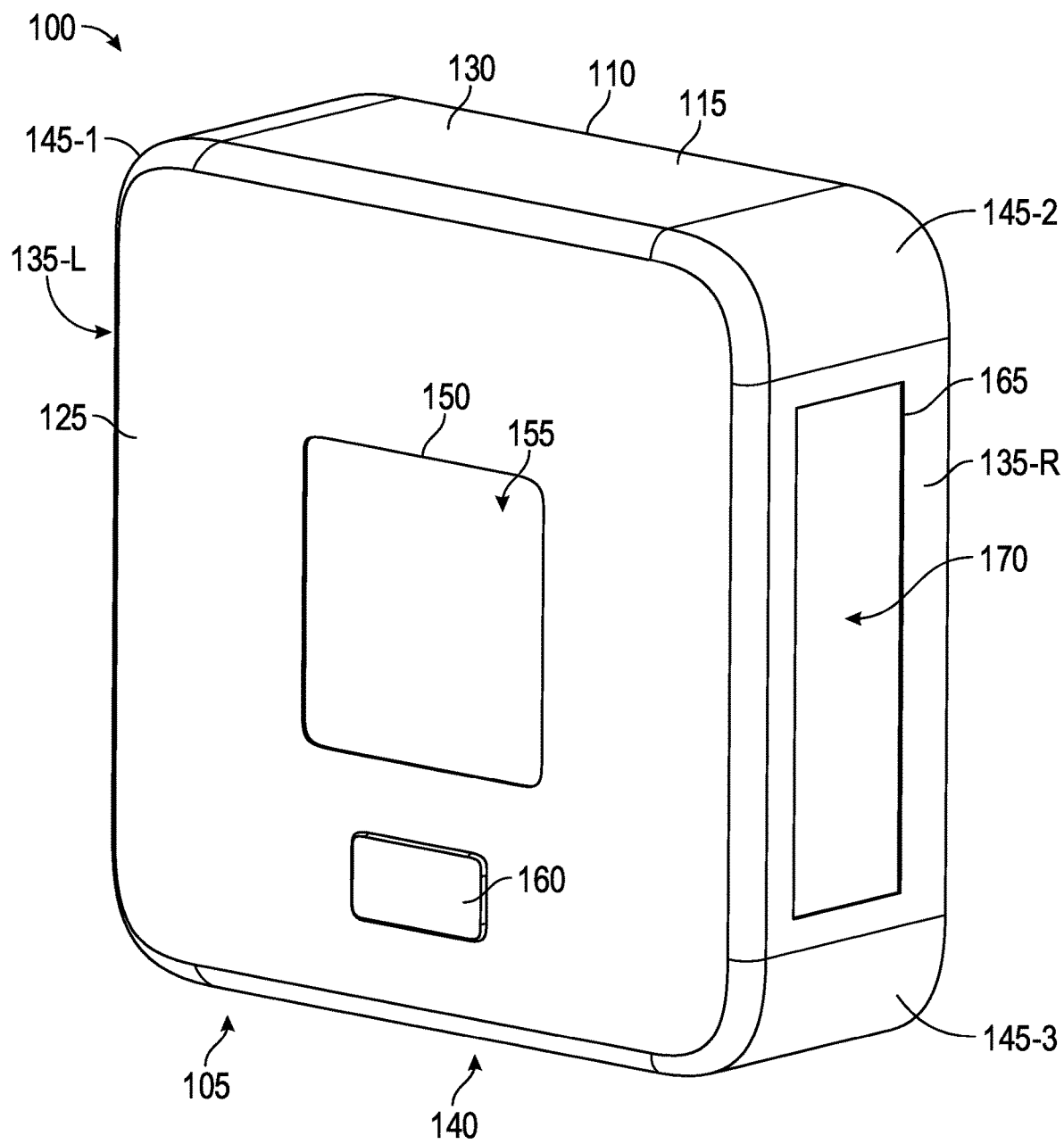
FIGS. 1A and 1B provide perspective views of an exemplary electronic device for monitoring one or more parameters of an ambient environment, according to one or more embodiments.
Figure 1B:
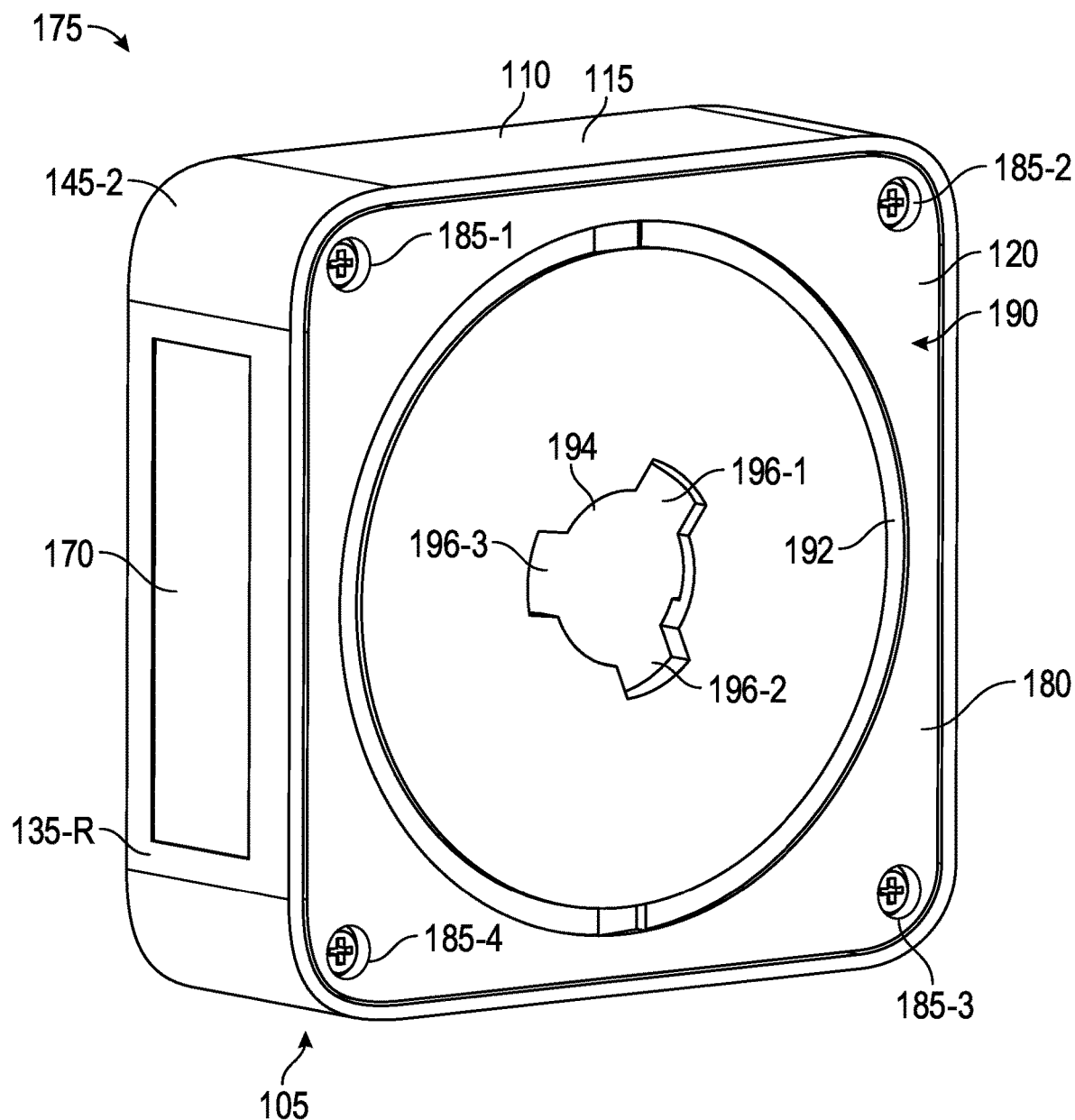

FIGS. 1A and 1B provide perspective views of an exemplary electronic device 105 for monitoring one or more parameters of an ambient environment, according to one or more embodiments. More specifically, FIG. 1A provides a front perspective view 100, and FIG. 1B provides a rear perspective view 175 of the electronic device 105 (also referred to herein as a sensor device).

The electronic device 105 comprises an enclosure 110 that defines an internal volume and a plurality of external surfaces. The enclosure 110 houses one or more components that provide various functionality of the electronic device 105. As shown, the enclosure 110 comprises a first cover member 115 (e.g., a cap) and a second cover member 120 (e.g., a base plate) that are removably attachable with each other, e.g., using threaded fasteners 185-1, 185-2, 185-3, 185-4 distributed around a perimeter of the enclosure 110.

In some embodiments, the enclosure 110 prevents the ingress of liquids (e.g., water) and/or particulates (e.g., dust) into the internal volume of the enclosure 110. In some embodiments, the second cover member 120 removably attaches to the first cover member 115 to form a sealed interface that seals the internal volume from the ambient environment. For example, one of the first cover member 115 and the second cover member 120 may include a gasket or other compliant material that contacts the other of the first cover member 115 and the second cover member 120 to form the sealed interface. In some embodiments, the enclosure 110 may have an Ingress Protection (IP) Code rating, such as IP66, IP66K, IP67, IP68, IP69K, and so forth. By limiting or preventing ingress of liquids and/or particulates into the internal volume, the electronic device 105 may provide increased longevity and increased reliability of the components in the internal volume. Further, in some cases the electronic device 105 having ingress protection may be deployed and reliably operate in harsher environments. In one example, the electronic device 105 may be deployed in a cargo compartment of a truck or trailer (e.g., attached to a wall of the cargo compartment), and the electronic device 105 may remain deployed during washing (e.g., power washing) or other cleaning of the cargo compartment.

The first cover member 115 defines a front surface 125, a top surface 130, side surfaces 135-L, 135-R, and a bottom surface 140 of the enclosure 110, and the second cover member 120 defines a rear surface 180 of the enclosure 110. The front surface 125, the top surface 130, the side surfaces 135-L, 135-R, the bottom surface 140, and the rear surface 180 may be referred to generically or collectively as external surface(s) of the enclosure 110.

As shown, the external surfaces of the enclosure 110 are planar, although other configurations are also contemplated. In some embodiments, the front surface 125 is in a first plane, and the top surface 130, the side surfaces 135-L, 135-R, and the bottom surface 140 are in respective second planes that are orthogonal to the first plane. In some embodiments, when the first cover member 115 and the second cover member 120 are attached, the rear surface 180 is in a third plane that is parallel to the first plane and orthogonal to each of the second planes.

The enclosure 110 may have any suitable external profile. In some embodiments, the external surfaces of the enclosure 110 extend to each other (e.g., forming right angle interfaces with each other). In some embodiments, the enclosure 110 further includes transition sections between different ones of the front surface 125, the top surface 130, the side surfaces 135-L, 135-R, the bottom surface 140, and the rear surface 180, where the transition sections may also form external surfaces of the enclosure 110. In another example, the transition sections include curved corner sections 145-1, 145-2, 145-3, 145-4 that extend between various pairs of the top surface 130, the side surfaces 135-L, 135-R, and the bottom surface 140. In another example, and as shown in the view 100, the transition sections include beveled edges that extend between the front surface 125 and each of the top surface 130, the side surfaces 135-L, 135-R, the bottom surface 140, and the curved corner sections 145-1, 145-2, 145-3, 145-4. Beneficially, the transition sections of the enclosure 110 allow the electronic device 105 to have a reduced external profile, which reduces the likelihood of the electronic device 105 being intentionally or incidentally contacted (e.g., bumped or snagged) while deployed, and/or reduces the likelihood of such contact causing dislocation or damage to the electronic device 105.

In some embodiments, the second cover member 120 comprises an attachment interface 190 at the rear surface 180 of the enclosure 110. In some embodiments, the attachment interface 190 attaches to a wall of a compartment of a vehicle, or to another vertical (or substantially vertical) surface in an environment, which provides the electronic device 105 with the orientation depicted in the views 100, 175 (e.g., corresponding to the descriptors "top", "side", "bottom", "rear"). In some embodiments, the attachment interface 190 attaches directly to the wall. In other embodiments, the attachment interface 190 attaches to a complementary attachment interface that is directly attached to the wall (e.g., a mounting plate that screws into the wall and that includes complementary features that mate with features of the attachment interface 190). The attachment interface 190 may use any suitable attachment techniques that provide a suitable attachment force with the electronic device 105 to reduce the likelihood of dislocation of the electronic device 105 due to intentional or incidental contact. For example, the attachment interface 190 may include threaded surfaces, grooves, snap fits, tabs, detents, and so forth that engage with complementary features to attach the electronic device 105 to the wall. In one non-limiting example, the attachment interface 190 provides between 5 and 10 kilograms-force (kgf) of attachment force when attached, through the complementary attachment interface, to the wall. Other values of the attachment force are also contemplated.

In FIG. 1B, the attachment interface 190 defines an annular groove 192 that circumscribes, and is coaxial with, a central recess 194 in the third plane of the rear surface 180. The annular groove 192 and the central recess 194 each extend partly through the second cover member 120 from the rear surface 180. In some embodiments, the annular groove 192 receives a corresponding feature (e.g., an annulus or annular segment(s)) arranged on the wall or other surface (or on the complementary attachment interface) to support and/or guide the attachment of the electronic device 105 to the wall or other surface. In other embodiments, the annular groove 192 may receive a gasket or O-ring for waterproofing purposes. As shown, the central recess 194 defines three (3) circumferential recesses 196-1, 196-2, 196-3. When a user manipulates the electronic device 105 to attach the electronic device 105 to the wall or other surface, a central raised feature of the complementary attachment interface (or wall) is received in the central recess 194, and a circumferential raised feature (annulus or one or more tabs) of the complementary attachment interface (or wall) is received in the annular groove 192. In some embodiments, the electronic device 105 and the attachment interface 190 may be rotated by the user after the raised feature(s) are received in the central recess 194 and/or the annular groove 192. For example, the central raised feature may include a cylinder and circumferential flanges, and the rotation of the attachment interface 190 relative to the central raised feature causes the circumferential flanges to rotate within the circumferential recesses 196-1, 196-2, 196-3 of the central recess 194, which thereby attaches (and retains) the attachment interface 190 to the wall.

The front surface 125 of the enclosure 110 defines an opening 150 extending through the first cover member 115. As shown, the opening 150 is disposed near a center of the front surface 125 and is square-shaped. A window 155 is disposed in the opening 150 that provides visible transmissivity into the internal volume of the enclosure 110 through the first cover member 115 while maintaining the ingress protection of the enclosure 110. Any suitable arrangement and/or materials of the window 155 are contemplated, such as a transparent or substantially transparent plastic, glass, and so forth. The window 155 may be attached to, or integrated with, structural component(s) of the electronic device 105 using any suitable techniques that prevent ingress of liquids into the internal volume through the opening 150. Further, the window 155 may be arranged substantially flush with the front surface 125, or slightly recessed from the front surface 125. In one non-limiting example, the window 155 is formed of an acrylic, such as poly(methyl methacrylate) (PMMA). The window 155 may be adhered to the first cover member 115 using a suitable adhesive. The window 155 may be recessed slightly from the front surface 125, such as 0.05 millimeter (mm). In an alternate implementation, the front surface 125 comprises a sheet of material (e.g., acrylic) that is masked (e.g., silkscreen painted) to define the transparent window 155 and the non-transparent portions of the front surface 125.

In some embodiments, a display device of the electronic device 105 is disposed beneath the window 155, such that the display device is viewable at the front surface 125 through the window 155 (e.g., from outside the electronic device 105). In some embodiments, the electronic device 105 comprises an input device 160 disposed at the front surface 125 and that maintains the ingress protection of the enclosure 110. Although the input device 160 is depicted as a physical button extending outwardly from the front surface 125, alternate implementations of the input device 160 may have other forms and/or may be disposed at different external surface(s) of the enclosure 110. Further, alternate implementations may have multiple input devices 160 disposed at one or more of the external surfaces of the enclosure 110. Alternate implementations of the input device 160 may use any suitable input sensing technology (e.g., resistive, capacitive, inductive, optical). For example, the input device 160 may be a capacitive sensing device that is also disposed at the window 155. In some embodiments, the display device and the input device 160 may overlap with each other and/or may include shared circuitry (e.g., substantially transparent electrodes).

The input device 160 and the display device are connected with each other through one or more computer processors of the electronic device 105 that are disposed in the internal volume. In some embodiments, the displayed content (e.g., information) on the display device is responsive to inputs received at the input device 160. For example, receiving a first press at the input device 160 may activate the display device and may cause a current temperature measurement to be displayed, receiving a second press at the input device 160 may display a measurement of a different parameter monitored by the electronic device 105, and so forth. In this way, receiving multiple inputs at the input device 160 may cause the display device to cycle through a predefined sequence of presenting information to a user. In some embodiments, inputs received at the input device 160 may provide user configuration information for the electronic device 105.

The side surface 135-R defines an opening 165 extending through the first cover member 115. As shown, the opening 165 is disposed near a center of the side surface 135-R and is rectangular-shaped. A thermal member 170 is disposed in the opening 165 that provides improved thermal conductivity, when compared with other portions of the enclosure 110, while maintaining the ingress protection of the enclosure 110. The thermal member 170 is thermally contacted to a temperature sensor that is disposed within the internal volume of the enclosure 110. The thermal member 170 improves the thermal responsivity of the electronic device and supports greater sampling rates of the temperature of the ambient environment while maintaining the ingress protection of the enclosure 110. As will be discussed in greater detail below, the thermal member 170 may be formed of any suitable material(s) and may have any dimensioning that provides a suitable thermal conductivity for the temperature sensor, and that provides suitable strength to maintain the ingress protection of the enclosure 110. In some embodiments, the thermal member 170 comprises a metal, such as aluminum or stainless steel.

Figure 2B:
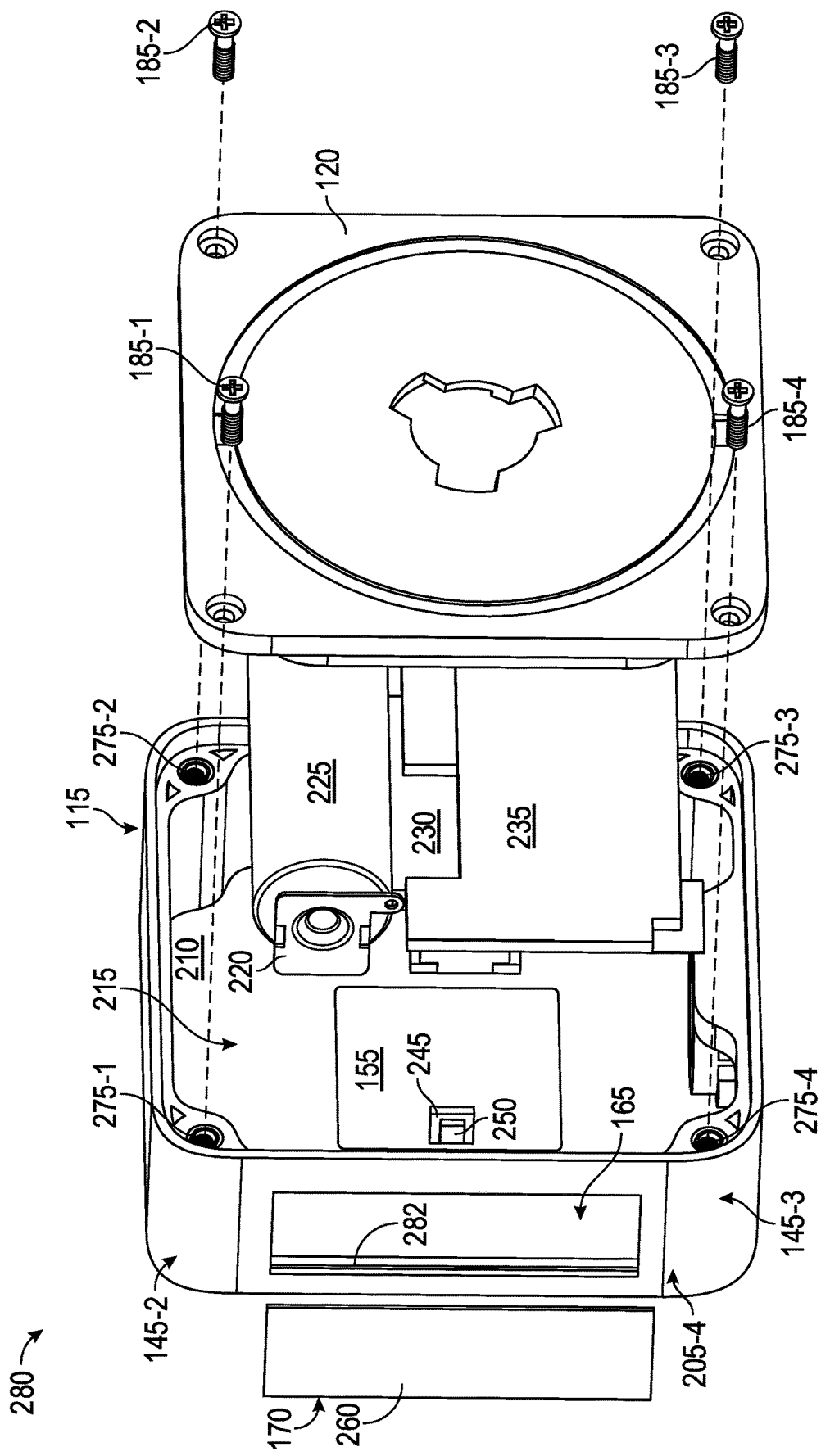
FIG. 2B provides a partially exploded view of the electronic device, according to one or more embodiments.

Refer now to FIGS. 2A and 2B, which provide a rear view 200 of the first cover member 115 and a partially exploded view 280 of the electronic device 105, respectively. The first cover member 115 defines sidewalls 205-1, 205-2, 205-3, 205-4 and an internal surface 210 that is opposite the front surface 125 and that extends to the sidewalls 205-1, 205-2, 205-3, 205-4. The sidewall 205-1 defines the top surface 130, the sidewall 205-2 defines the side surface 135-L, the sidewall 205-3 defines the bottom surface 140, and the sidewall 205-4 defines the side surface 135-R. The sidewalls 205-1, 205-2 extend to the curved corner section 145-1, the sidewalls 205-2, 205-3 extend to the curved corner section 145-4, the sidewalls 205-3, 205-4 extend to the curved corner section 145-3, and the sidewalls 205-1, 205-4 extend to the curved corner section 145-2.

The opening 165 extends through the sidewall 205-4, and a slot 282 is formed in the sidewall 205-4 that circumscribes the opening 165. Described another way, the areal extent of the slot 282 and the areal extent of the opening 165 are overlapping with each other, and the areal extent of the slot 282 is greater than the areal extent of the opening 165. The thermal member 170 is disposed in the slot 282, and the thermal member 170, the sidewalls 205-1, 205-2, 205-3, 205-4, and the curved corner sections 145-1, 145-2, 145-3, 145-4 (along with the second cover member 120 when attached) define an internal volume 215 of the enclosure 110. In some embodiments, the thermal member 170 forms a portion of an external surface of the enclosure 110.

The thermal member 170 defines a first, external surface 260 and a second, internal surface 265 opposite the first external surface 260. The thermal member 170 may have any suitable shape. As shown, the thermal member 170 is rectangular-shaped, although other shapes that are suitable to cover the opening 165 are also contemplated. The first, external surface 260 is in a first plane and the second, internal surface 265 is in a second plane parallel to the first plane. The first plane and the second plane are parallel to a third plane of the side surface 135-R.

The slot 282 may have any suitable disposition relative to the opening 165. As shown, the slot 282 is arranged along a midline of the sidewall 205-4, such that the first, external surface 260 of the thermal member 170 is recessed from the side surface 135-R to a depth d. In other embodiments, the slot 282 may be disposed such that the first, external surface 260 of the thermal member 170 is flush with the side surface 135-R. Stated another way, the external surface 260 and the side surface 135-R in this configuration may form a substantially continuous external surface of the enclosure 110.

The second, internal surface 265 of the thermal member 170 is thermally contacted to a temperature sensor 250 disposed inside the internal volume 215. In some embodiments, the thermal member 170 and the temperature sensor 250 are in direct thermal contact with each other (that is, without material(s) disposed therebetween). In other embodiments, the thermal member 170 and the temperature sensor 250 thermally contact each other through one or more materials, such as a thermally conductive adhesive (epoxy).

The material(s), the dimensions, and the arrangement of the thermal member 170 may be selected to provide a suitable thermal conductivity between the thermal member 170 and the temperature sensor 250. Generally, a greater thermal conductivity supports greater sampling rates of the temperature of the ambient environment. A larger area of the first, external surface 260 and/or the second, internal surface 265 tends to correspond to a greater thermal conductivity. In some embodiments, the surface area of portion of the first, external surface 260 that is exposed at the opening 165 to the ambient environment is greater than 50% of the surface area of the side surface 135-R.

A smaller thickness of the thermal member 170 also tends to correspond to a greater thermal conductivity. In some cases, the thermal member 170 may have, depending on the material(s) selected for the thermal member 170, at least a minimum thickness to provide sufficient structural strength at the sidewall 205-4. In some embodiments, the thermal member 170 is formed of sheet aluminum, and has a width between 5 and 25 mm, and has a length between 15 and 60 mm (i.e., having an area between 75 and 1500 $mm^2$). In one non-limiting example, the thermal member 170 is about 10 mm wide and 30 mm long (an area of about 300 $mm^2$), and about 0.5 mm thick.

In some embodiments, substantially all of the first, external surface 260 of the thermal member 170 is exposed to the ambient environment at the opening 165, and substantially all of the second, internal surface 265 of the thermal member 170 is exposed to the internal volume 215. As discussed herein, "substantially all" refers to percentages of 75% or more of the surface area of the surface. It will further be noted that the percentage of the first, external surface 260 that is exposed may be the same or may be different than the percentage of the second, internal surface 265 that is exposed. Beneficially, exposing substantially all of the first, external surface 260 and of the second, internal surface 265 improves the thermal conductivity between the thermal member 170 and the temperature sensor 250, as the insulative properties of the material of the sidewall 205-4 overlapping the first, external surface 260 and/or the second, internal surface 265 tends to reduce the thermal conductivity between the thermal member 170 and the temperature sensor 250.

The first cover member 115 may be manufactured using any suitable techniques. In some embodiments, the first cover member 115 is formed of an injection-molded plastic that defines the opening 165 and the slot 282, and the thermal member 170 is later inserted in the slot 282. In such cases, adhesive or other fastening techniques may be used to attach the thermal member 170 to the sidewall 205-4 at the opening 165. In other embodiments, the injection-molding process occurs around the thermal member 170 such that the sidewall 205-4 is integrally formed with the thermal member 170.

Although the opening 165 and the thermal member 170 are depicted along the side surface 135-R of the sidewall 205-4, alternate implementations of the enclosure 110 may have the opening 165 and/or the thermal member 170 at other locations. However, the side surface 135-R (or alternately, the side surface 135-L) may be beneficial for a number of reasons. For example, placement of the thermal member 170 along the side surface 135-R avoids pooling of water (which is more likely along the top surface 130), and/or provides improved contact with air flow in the ambient environment (e.g., disposed away from the attachment interface 190). The surface area of the side surface 135-R is largely unused by other components (such as the window 155, the input device 160, the attachment interface 190, and so forth) which permits the thermal member 170 to have a larger surface area. In some cases, the thermal member 170 may be disposed along the side surface 135-R to be disposed away from wireless transmitter circuitry to minimize the effect of the thermal member 170 on wireless signal transmissibility.

Some examples of alternate implementations of the enclosure 110 include disposing the thermal member 170 at one of the curved corner sections 145-1, 145-2, 145-3, 145-4, as a projecting tab from an external surface of the first cover member 115, as a metal strip extending around the front surface 125, or embedded or integrated within one of the sidewalls 205-1, 205-2, 205-3, 205-4. Further, although the thermal member 170 has been depicted as being monolithically formed of a metal material, alternate implementations may include metal patterns, and/or combinations of metal(s) or other materials.

The electronic device 105 further comprises an internal power source that disposed in the internal volume 215. The internal power source supplies electrical power to various electronic components of the electronic device 105, which may include components within the internal volume 215 as well as external components electrically connected through a connector interface 270. As shown, the internal power source comprises a removable battery 225 using any suitable energy storage technology, such as alkaline, lithium, lithium-ion, nickel metal hydride, and so forth. The battery 225 is retained by a battery receptacle 220 that is attached to the first cover member 115. The battery receptacle 220 may be mounted on the internal surface 210, e.g., using threaded fasteners, adhesive, and so forth. The various components disposed in the internal volume 215 may be attached to the first cover member 115 and/or to the second cover member 120. In some embodiments, the battery 225 is a replaceable battery, whether one-time use or rechargeable. The dimensions of the battery 225 may be standardized (e.g., a "AA" battery) or may have a proprietary form factor. In alternate implementations, the battery 225 may be non-removable and rechargeable. For example, the battery 225 may be recharged through the enclosure 110, e.g., using an inductive charging coil in the internal volume 215.

The electronic device 105 further comprises a display device 230 mounted on the internal surface 210. The display device 230 is disposed in the internal volume 215 behind the window 155 such that the display device 230 is viewable at the front surface 125 of the enclosure 110. The display device 230 may use any suitable display technology, such as liquid-crystal display (LCD), light-emitting diode (LED), organic LED (OLED), and so forth. The display device 230 receives electric power from the battery 225, and is coupled with one or more computer processors disposed in the internal volume 215.

The electronic device 105 further comprises a first printed circuit board assembly (PCBA) 235 disposed in the internal volume 215 and attached to the first cover member 115. One or more electronic components are mounted on the first PCBA 235 that provide functionality of the electronic device 105. In some embodiments, the one or more electronic components comprise computing hardware, such as one or more computer processors, a memory, and so forth. The one or more electronic components receive electric power from the battery 225 and may be interconnected with each other using conductive traces on the first PCBA 235. In some embodiments, the one or more computer processors may include (1) signal processing circuitry for receiving and processing sensor signals, (2) wireless transceiver circuitry to communicate wireless signals with one or more external electronic devices, and/or (3) display driver circuitry to drive display signals to the display device 230.

As shown, the first PCBA 235 comprises wireless transmitter circuitry 240 to transmit wireless signals to the one or more external electronic devices. In some embodiments, the wireless signals include information representative of measurements of one or more parameters of the ambient environment (e.g., from acquired sensor signals). In some embodiments, the wireless transmitter circuitry 240 is included in wireless transceiver circuitry, which may be included in the one or more computer processors.

In some embodiments, a second PCBA 245 is disposed in the internal volume 215 and is attached to the first cover member 115. In some embodiments, the temperature sensor 250 is mounted to the second PCBA 245 and is thermally connected to the second, internal surface 265 of the thermal member 170. For example, the temperature sensor 250 may be adhered to the thermal member 170 using a thermally conductive epoxy, such that the second PCBA 245 is in a fixed arrangement with the thermal member 170 and the first cover member 115.

The first PCBA 235 and the second PCBA 245 are connected with each other, such that sensor signals from the temperature sensor 250 may be communicated to the one or more computer processors of the first PCBA 235. The connections may further support communication of power and/or signals from the one or more computer processors to the temperature sensor 250 (e.g., control signals). In some embodiments, the first PCBA 235 and the second PCBA 245 are connected by a flexible PCB 255. In other embodiments, the first PCBA 235 and the second PCBA 245 are connected by cabling having one or more conductors, such as a ribbon cable.

In some embodiments, the first PCBA 235 and the second PCBA 245 are connected at a first end of the first PCBA 235 nearest the side surface 135-R of the enclosure 110, and the wireless transmitter circuitry 240 is disposed near a second end of the first PCBA 235 opposite the first end. Beneficially, by arranging the second PCBA 245 (with the temperature sensor 250) near the side surface 135-R and away from the wireless transmitter circuitry 240, the effect of the thermal member 170 on the wireless signal transmissibility is minimized Described another way, the wireless transmitter circuitry 240 may be positioned within the enclosure 110 such that wireless signals are propagated primarily through portions of the enclosure 110 having greater wireless signal transmissibility (e.g., the antenna radiation patterns of the wireless transmitter circuitry 240 have minimal overlap with metal components of the enclosure 110, such as the thermal member 170).

In some embodiments, posts 275-1, 275-2, 275-3, 275-4 are arranged at the curved corner sections 145-1, 145-2, 145-3, 145-4. Each of the posts 275-1, 275-2, 275-3, 275-4 includes internal threads that engage with external threads of the threaded fasteners 185-1, 185-2, 185-3, 185-4 to secure the second cover member 120 to the first cover member 115. As discussed above, the second cover member 120 removably attaches to the first cover member 115 (using the threaded fasteners 185-1, 185-2, 185-3, 185-4 and the posts 275-1, 275-2, 275-3, 275-4) to form a sealed interface that seals the internal volume 215 from the ambient environment.

Figure 3:
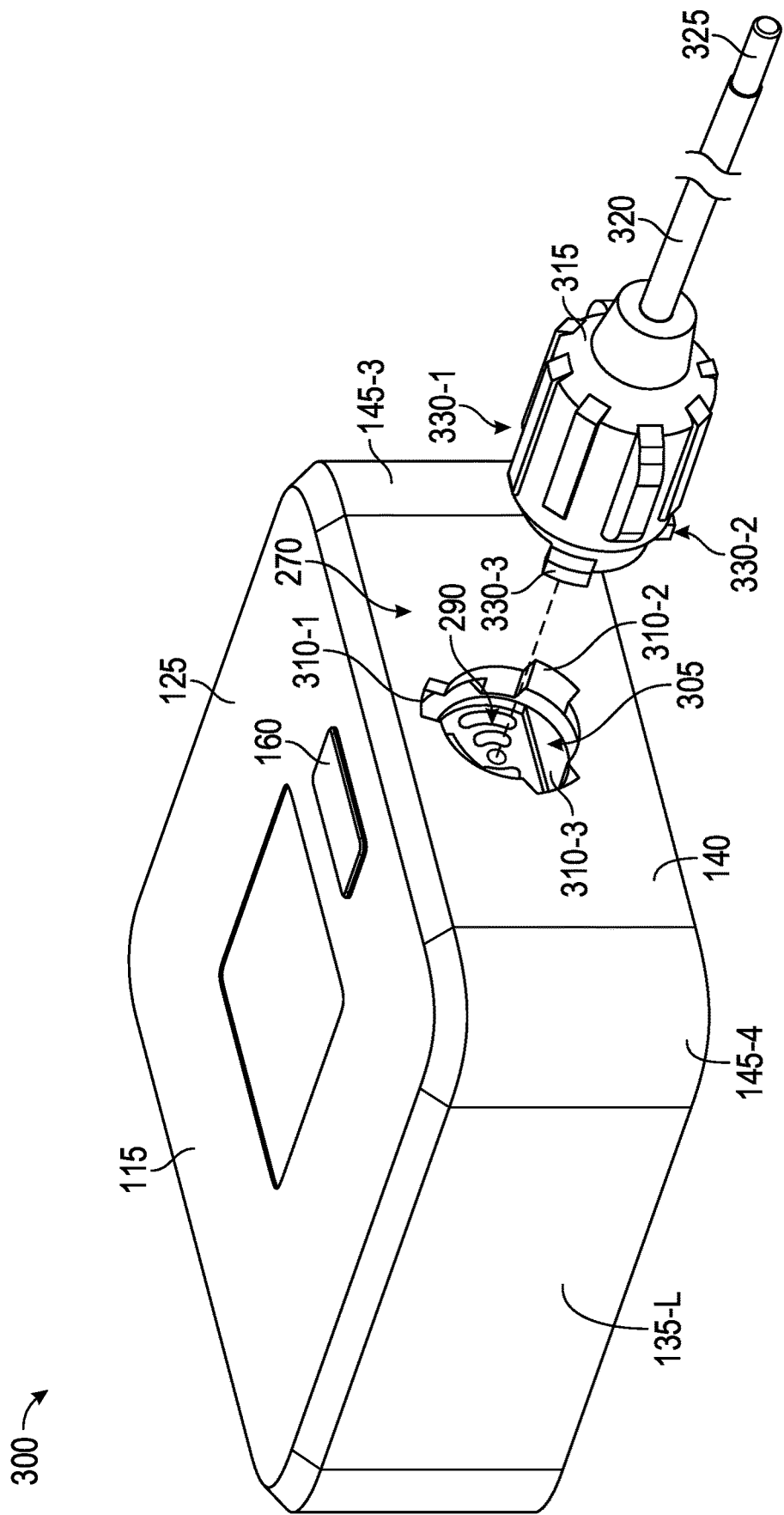
FIG. 3 provides a perspective view of an exemplary connector interface at a bottom surface of the enclosure, according to one or more embodiments.

Refer also to FIG. 3, which provides a perspective view 300 of an exemplary connector interface 270 at a bottom surface 140 of the enclosure 110. The connector interface 270 defines a recess 305 from the bottom surface 140, and a plurality of circumferential slots 310-1, 310-2, 310-3 disposed around the recess 305. The connector interface 270 includes a PCB 285, and a plurality of conductors 290 on the PCB 285 that are exposed to the ambient environment at the recess 305.

The connector interface 270 further defines a plurality of circumferential slots 310-1, 310-2, 310-3 that receive circumferential flanges 330-1, 330-2, 330-3 of a connector body 315, where rotation of the connector body 315 relative to the connector interface 270 causes the received circumferential flanges 330-1, 330-2, 330-3 to advance in the circumferential slots 310-1, 310-2, 310-3, attaching (and retaining) the connector body 315 to the connector interface 270. The connector body 315 is connected with an external temperature sensor 325 through a cable 320 (e.g., an external temperature probe).

The connector interface 270 connects to the one or more electronic components of the first PCBA 235 and/or the battery 225 through the plurality of conductors 290, and supports communication of power and/or signals with an external electronic device connected at the connector interface 270 (e.g., such as one or more external sensors). In some embodiments, and as shown in the view 300, an external temperature sensor 325 connects with one or more computer processors of the first PCBA 235 through conductors of the connector body 315 and through the connector interface 270, such that the one or more computer processors may monitor a temperature of the ambient environment of the electronic device 105 using the temperature sensor 250, as well as a temperature of a remote location using the external temperature sensor 325. Additional details relating to the connector interface 270 are described in U.S. application Ser. No. 17/817,961, titled "ELECTRONIC DEVICE WITH CONNECTOR INTERFACE FOR ROTATING EXTERNAL CONNECTOR" filed Aug. 5, 2022.

Figure 4:
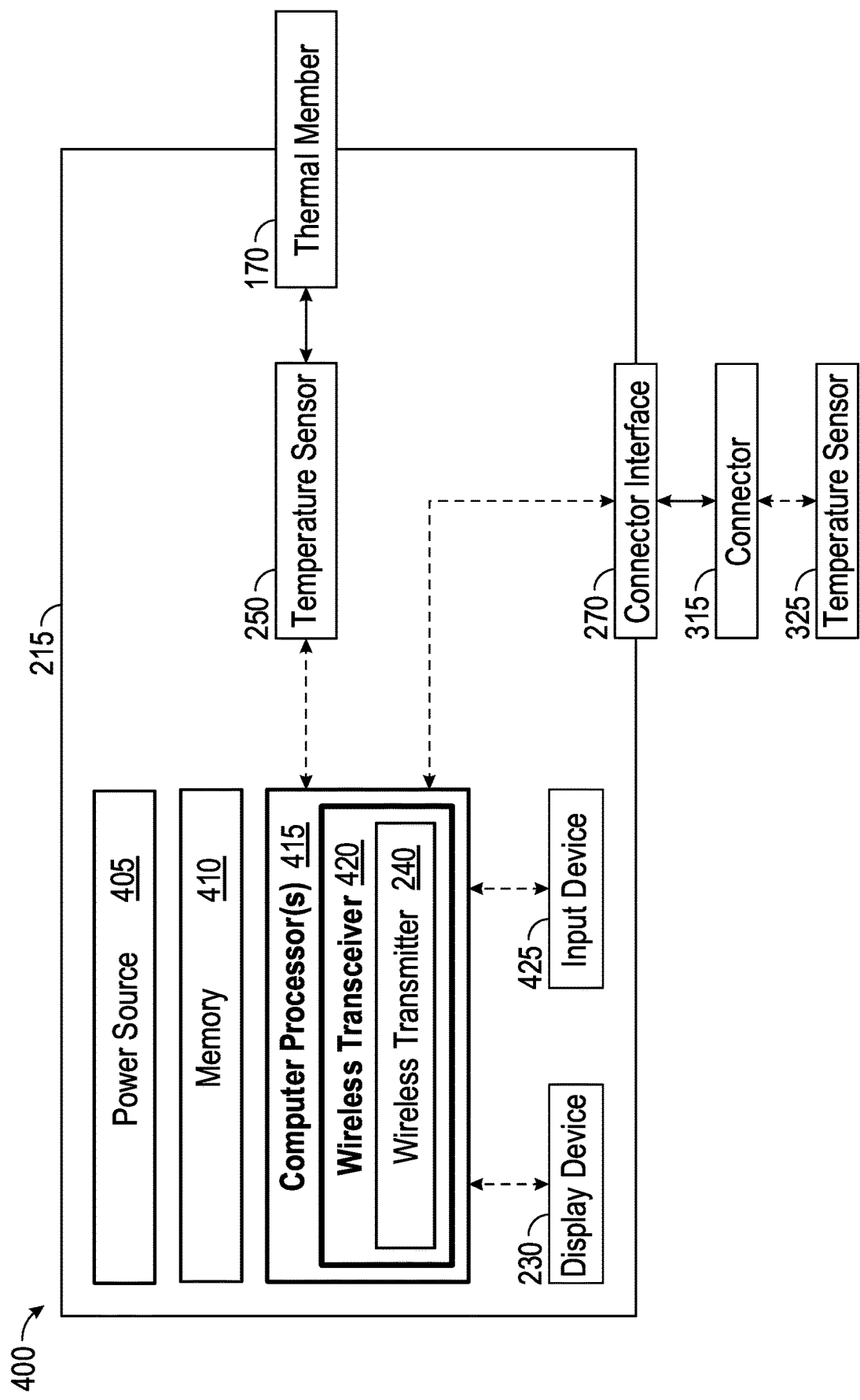
FIG. 4 illustrates a block diagram of an exemplary system for monitoring an environment, according to one or more embodiments.

FIG. 4 illustrates a block diagram of an exemplary system 400 for monitoring an environment, according to one or more embodiments. The features illustrated in FIG. 4 may be used in conjunction with other embodiments described herein, such as with the electronic device 105. The system 400 comprises a power source 405 (such as the battery 225 described above), a memory 410, one or more computer processors 415, the display device 230, an input device 425 (such as the input device 160 described above), and the temperature sensor 250 disposed within the internal volume 215 of the electronic device. The thermal member 170 and the connector interface 270 contact the internal volume 215 as well as the ambient environment of the electronic device.

The memory 410 may include a variety of computer-readable media selected for relative performance or other capabilities: volatile and/or non-volatile media, removable and/or non-removable media, etc. The memory 410 may include cache, random access memory (RAM), storage, etc. Storage included in the memory 410 typically provides a non-volatile memory for the electronic device 105, and may include one or more different storage elements such as Flash memory, a hard disk drive, a solid state drive, an optical storage device, and/or a magnetic storage device.

The one or more computer processors 415 generally include any processing element(s) capable of performing various functions described herein. Some non-limiting examples of the one or more computer processors 415 include a microprocessor, a digital signal processor (DSP), an application-specific integrated chip (ASIC), and a field programmable gate array (FPGA). While depicted as a single element within the electronic device 105, the one or more computer processors 415 contemplates a single processor, multiple processors, a processor or processors having multiple cores, as well as combinations thereof. In one embodiment, the one or more computer processors 415 represents a central processing unit (CPU) of the electronic device 105.

The one or more computer processors 415 comprise wireless transceiver circuitry 420, which comprises wireless transmitter circuitry 240 and wireless receiver circuitry (not shown). In some alternate implementations, the wireless transceiver circuitry 420 and/or the wireless transmitter circuitry 240 may be implemented separately from the one or more computer processors 415.

The temperature sensor 250 may have any suitable implementation, such as a thermocouple, a resistance temperature detector (RTD), a thermistor, and so forth. In some embodiments, and as discussed above, the temperature sensor 250 may be mounted to the second PCBA 245 in the internal volume 215. The input device 425 may use any suitable input sensing technology (e.g., resistive, capacitive, inductive, optical).

In some embodiments, the one or more computer processors 415 may further include signal processing circuitry for receiving and processing sensor signals from the temperature sensor 250, the temperature sensor 325, and/or any other sensors of the electronic device 105. The one or more computer processors 415 may further include display driver circuitry to drive display signals to the display device 230. In other embodiments, some or all of the functionality of the signal processing circuitry and/or the display driver circuitry may be implemented in computer-readable code that is stored in the memory 410 and executed by the one or more computer processors 415. In this way, various aspects of the present disclosure may take the form of entirely hardware embodiments, entirely software embodiments (which includes firmware, resident software, microcode, etc.) or embodiments combining software and hardware aspects that may all generally be referred to herein as a "circuit," "module" or "system."

Figure 5:
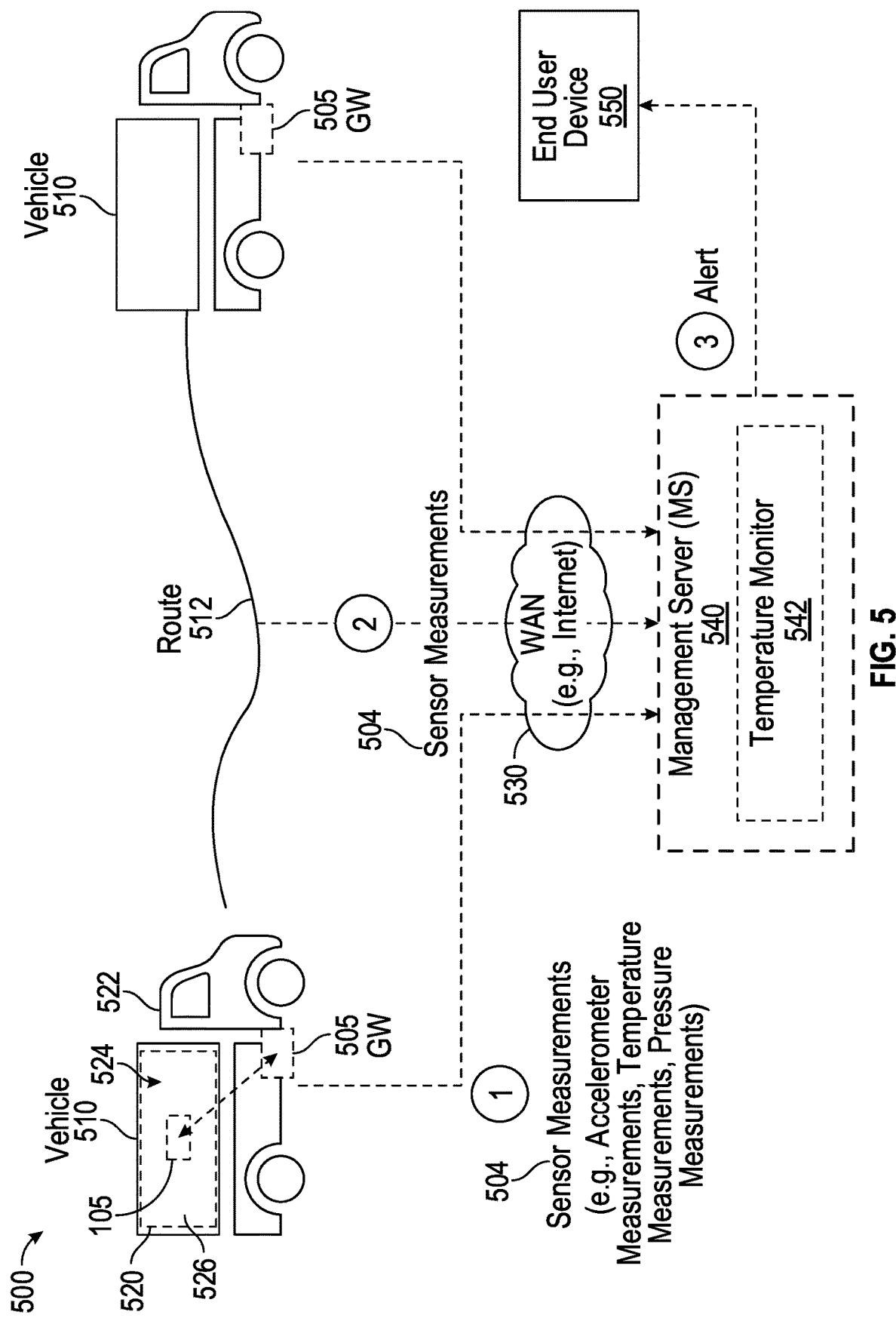
FIG. 5 illustrates a block diagram of the exemplary system for monitoring an environment of a vehicle, according to one or more embodiments.

FIG. 5 illustrates a block diagram of an exemplary system 500 for monitoring an environment of a vehicle, according to one or more embodiments. The features illustrated in FIG. 5 may be used in conjunction with other embodiments described herein, such as with various embodiments of the electronic device 105.

The system 500 includes a vehicle 510 and an optional management server 540. In some embodiments, the vehicle 510 is implemented as a tractor coupled with a trailer part of a fleet used for transportation of goods. For example, the vehicle 510 may be implemented as a tractor, a tow truck, a semi-truck, a light or heavy truck, or any other type of vehicle that is operative to be coupled with and pull a trailer. The vehicle 510 may alternately be implemented as a car, a van, a bus, a specialized vehicle, a bicycle, a motorized bike, or any other type of vehicle used for transportation of goods or persons without departing from the scope of the present invention. The vehicle 510 departs from a first location and moves along a route 512 toward a destination. In some embodiments, the vehicle 510 can be part of a fleet of vehicles that is operated by a fleet manager. In some embodiments, the fleet of vehicles is managed through the management server 540. In other embodiments, the vehicle 510 is a stand-alone vehicle and is not part of a fleet.

The vehicle 510 defines one or more compartments, which may include one or more passenger compartments, one or more cargo compartments, and/or combinations thereof. Environmental parameters of the one or more compartments may be individually or collectively controlled (e.g., air-conditioned, refrigerated, heated, humidified, dehumidified, illuminated, darkened, ventilated, pressurized, and so forth) to provide a suitable environment for the passenger(s) and/or cargo being transported by the vehicle 510. In some embodiments, one or more electronic devices 105 are deployed in one or more compartments of the vehicle 510 to monitor the environmental parameters.

In FIG. 5, the vehicle 510 is depicted as a box truck having a cab 522 defining a passenger compartment of the vehicle 510, and a cargo box 520 attached to the cab 522 and defining a cargo compartment 524 of the vehicle 510. An electronic device 105 is mounted to a wall 526 of the cargo box 520, or to another vertical or substantially vertical surface within the cargo compartment 524, such as a divider or cabinet.

The electronic device 105 operates to monitor the ambient environment of the cargo compartment 524. For example, the cargo compartment 524 may be refrigerated to transport heat-sensitive cargo, and the electronic device 105 monitors a temperature of the cargo compartment 524 in one or more locations. The electronic device 105 acquires sensor measurements 504, e.g., temperature measurements using the internal temperature sensor 250 and/or the external temperature sensor 325, and wirelessly transmits signals representative of the sensor measurements 504 to one or more external electronic devices of the vehicle 510.

The one or more external electronic devices of the vehicle 510 include a gateway device 505 and/or a computing device of the vehicle 510 (not shown). In some embodiments, the vehicle 510 includes a computing device with which the vehicle 510 was manufactured. The computing device is an electronic device that is integrated to the vehicle 510 and is accessible by aftermarket components through one or more communication interfaces.

In some embodiments, the vehicle 510 includes the gateway device 505. In other embodiments, the gateway device 505 may be optional. The gateway device 505 may be located at any suitable location inside the vehicle 510 or outside of the vehicle 510. In some embodiments, the gateway device 505 and the electronic device 105 are disposed in a cargo compartment 524 of the vehicle 510.

The gateway device 505 is an electronic device that is operative to connect with a management server 540 through a Wide Area Network (WAN) 530. The connection of the gateway device 505 to the WAN 530 is a wireless connection (e.g., Wi-Fi, cellular connection, etc.). In some embodiments, the gateway device 505 and the management server 540 may be subject to an intermittent connectivity with the WAN 530. The gateway device 505 is operative to record or obtain data related to the vehicle 510 on which it is mounted and transmit the data to the management server 540. In some embodiments, the gateway device 505 is further operative to connect to the computing device of the vehicle 510. For example, the gateway device 505 may be connected to the computing device of the vehicle 510 through an On-Board Diagnostics (OBD) port of the vehicle 510. The gateway device 505 can obtain data pertaining to events that occur in the vehicle 510 (e.g., data related to components of the vehicle 510, such as the engine, and/or data originating from sensors located within the vehicle 510). The gateway device 505 is also operative to be coupled with one or more aftermarket devices of the vehicle 510 (i.e., devices that are not installed by the manufacturer of the vehicle 510) that are external to the gateway device 505. These aftermarket devices can include sensors, cameras, etc. that are operative to record and transmit data to the gateway device 505 through wired or wireless connection(s). The gateway device 505 is further operative to be coupled with the wheel monitoring systems 103A-D. The gateway device 505 is further operative to receive the sensor measurements 504 (or data representative thereof) from the electronic device 105. Further details of the gateway device 505 are discussed below with respect to FIG. 8.

In some embodiments, the management server 540 is a cloud-based server operative to receive data from one or more gateway devices (e.g., the gateway device 505). Further details of the management server 540 are discussed below with respect to FIG. 6. In some embodiments, the management server 540 includes a temperature monitor 542. In some embodiments, the management server 540 is optional and the temperature monitor 542 can be implemented in the gateway device 505 or in the computing device of the vehicle 510. Further, consistent with the discussion above, the management server 540, the gateway device 505, and/or the computing device of the vehicle 510 may include one or more other monitors that are operable to monitor one or more other environmental parameters corresponding to measurements acquired by sensors of the electronic device 105.

The temperature monitor 542 receives temperature measurements of the sensor measurements 504. In some embodiments, the temperature measurements are received by the gateway device 505 from the electronic device 105. In some embodiments, the temperature measurements are received by the computing device of the vehicle 510. In some embodiments, the temperature measurements are received by the management server 540 from the gateway device 505.

The temperature measurements are used by the temperature monitor 542 to determine whether temperature parameters are being maintained in one or more compartments of the vehicle 510 (e.g., the cargo compartment 524). In some embodiments, the determination operation is performed automatically without requiring intervention or other input by a user (e.g., a driver or passenger of the vehicle 510, an associate at an origin or a destination of the vehicle 510, a vendor or a customer of the cargo, and so forth) that is assessing the environmental parameters of the cargo compartment 524. Further, the determination is performed based on the sensor measurements 504 that are acquired during use (e.g., during motive operation) of the vehicle 510.

In some embodiments, the system 500 further includes an end user device 550. The end user device 550 is a computing device having any suitable configuration (e.g., laptop, workstation, smartphone, palm top, mobile phone, tablet, wearable device, etc.) that is capable of accessing network resources. For example, the end user device 550 may include software such as a web browser or web application that is capable of accessing the network resources (e.g., HTTP client, FTP client, SSH client, Telnet client, etc.). A user of the end user device 550 can connect to the management server 540 to access data about the environmental parameters of the vehicle 510.

In some embodiments, the user of the end user device 550 accesses a fleet management service that is provided through the management server 540 to monitor and track the vehicle 510 and one or more other vehicles. In some cases, the user of the end user device 550 is an owner of the vehicle 510 and/or the gateway device 505. In some cases, the user is an administrator of the vehicle 510 and the gateway device 505. In other cases, the user is a customer of a delivery service that owns the fleet including the vehicle 510. In other cases, the user is a driver of the vehicle 510. The end user device 550 is operative to receive one or more alerts related to the environmental parameters of the vehicle 510. An alert can include an indication that one or more environmental parameters is out of a predefined range of values.

Each of the electronic device 105, the gateway device 505, the end user device 550, and the management server 540 is implemented as an electronic device. As described herein, an electronic device stores and transmits (internally and/or with other electronic devices over a network) code (which comprises software instructions and which is sometimes referred to as "computer program code" or a "computer program") and/or data using machine-readable media (also called computer-readable media), such as machine-readable storage media (e.g., magnetic disks, optical disks, read only memory (ROM), flash memory devices, phase change memory) and machine-readable transmission media (also referred to as a "carrier") (e.g., electrical, optical, radio, acoustical or other form of propagated signals—such as carrier waves, infrared signals, and so forth). Thus, an electronic device (e.g., a computer) includes hardware and software, such as a set of one or more computer processors coupled to one or more machine-readable storage media to store code for execution on the set of one or more computer processors and/or to store data. For instance, an electronic device may include non-volatile memory storing the code, as the non-volatile memory persists the code even when the electronic device is unpowered (e.g., turned off), and while the electronic device is powered (e.g., turned on) that portion of the code that is to be executed by the computer processor(s) is copied from the slower, non-volatile memory into the faster, volatile memory (e.g., dynamic random access memory (DRAM), static random access memory (SRAM), and so forth) of the electronic device. Typical electronic devices also include a set or one or more physical network interface(s) to establish network connections (to transmit and/or receive code and/or data using propagating signals) with other electronic devices. One or more portions of an embodiment of the invention may be implemented using different combinations of software, firmware, and/or hardware.

Figure 6:
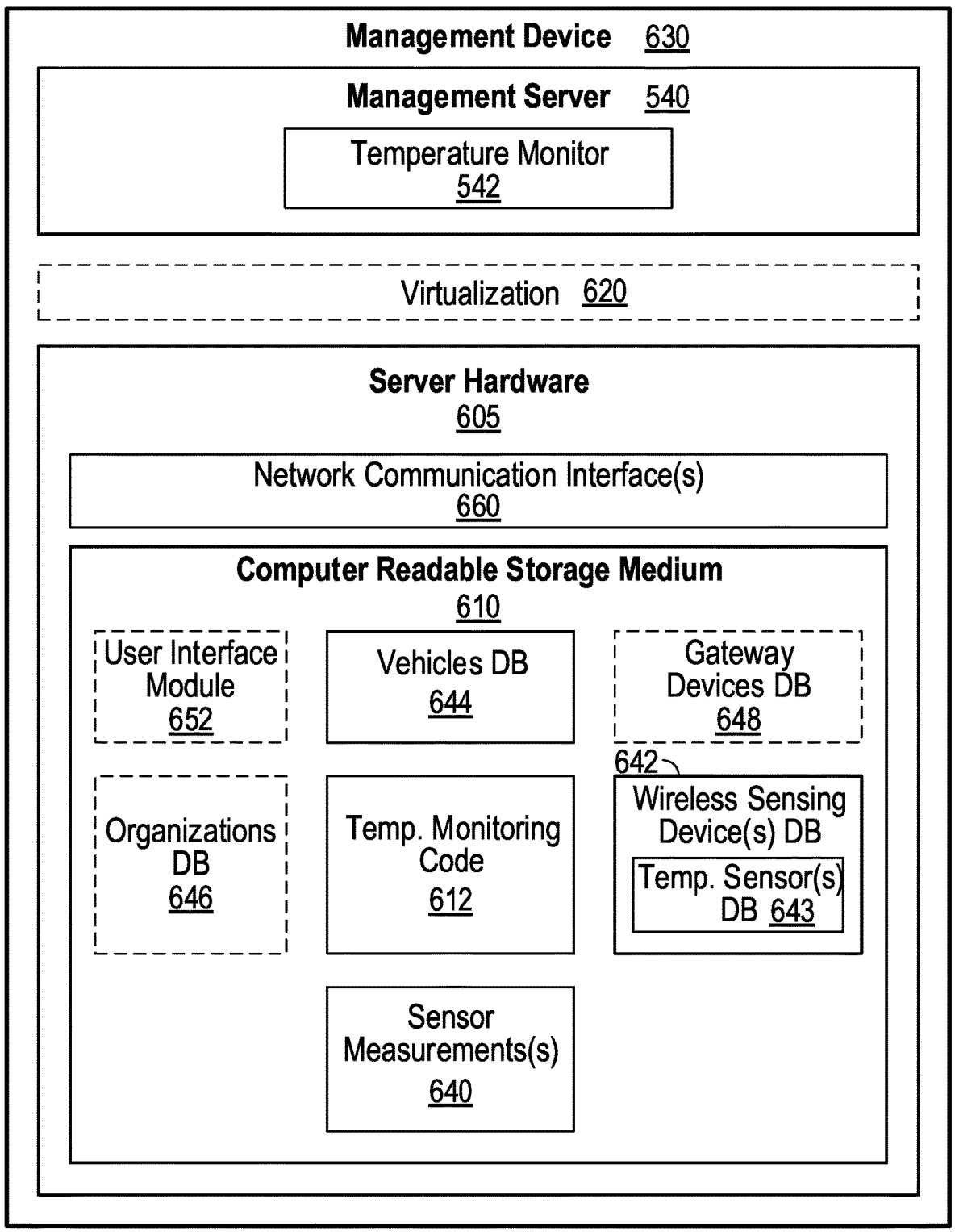
FIG. 6 illustrates a block diagram of an exemplary management device, according to one or more embodiments.

FIG. 6 illustrates a block diagram 600 of an exemplary management device 630, according to one or more embodiments. The features illustrated in FIG. 6 may be used in conjunction with other embodiments described herein, such as with various embodiments of the electronic device 105.

The management server 540 may implemented as a Web or cloud server, or a cluster of servers running on server hardware 605. In one embodiment, the management server 540 works for both single and multi-tenant installations, meaning that multiple organizations with different administrators may have electronic devices 105 and/or gateway devices 505 that are managed by the same management server 540.

According to one embodiment, the management server 540 is implemented on a management device 630 that includes the server hardware 605. The server hardware 605 includes one or more network communication interfaces 660 coupled with a computer-readable storage medium 610. The computer-readable storage medium 610 includes temperature monitoring code 612. The computer-readable storage medium 610 includes sensor measurements 640 (e.g., including temperature measurements, accelerometer measurements, pressure measurements, and so forth), a wireless sensing device(s) database 642 (e.g., including information regarding temperature sensors as a temperature sensors database 643, accelerometers, or other sensing devices), a vehicles database 644 (e.g., including information regarding the vehicles 510, such as information regarding the environmental parameters of the vehicles 510), an optional organizations database 646 (e.g., including information regarding the organizations to which the gateway devices 505, or the vehicles 510 belong), an optional gateway devices database 348 (e.g., including information regarding the gateway devices 505), and a user interface module 652.

While some embodiments of the management device 630 do not implement virtualization, other embodiments may use different forms of virtualization—represented by a virtualization layer 620. In these embodiments, the management server 540 and the portion of the server hardware 605 that executes the management server 540 form a virtual management server, which is a software instance of the modules stored on the computer readable storage medium 610.

Figure 7:
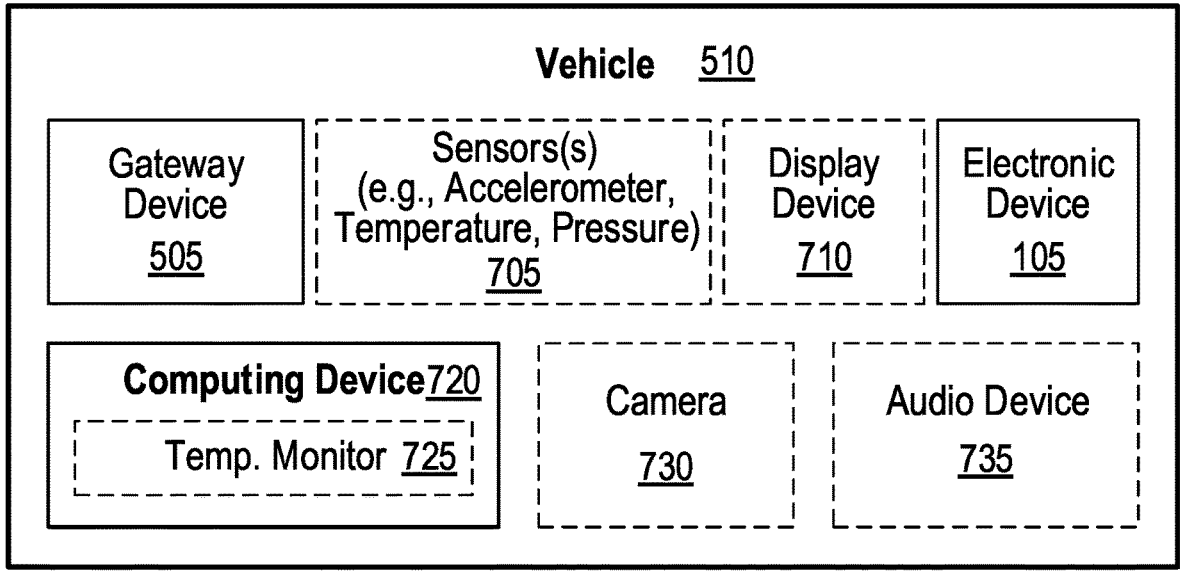
FIG. 7 illustrates a block diagram of an exemplary vehicle, according to one or more embodiments.

FIG. 7 illustrates a block diagram 700 of an exemplary vehicle 510, according to one or more embodiments. The features illustrated in FIG. 7 may be used in conjunction with other embodiments described herein, such as with various embodiments of the electronic device 105.

The vehicle 510 includes a computing device 720, which in some embodiments is an electronic device that installed by the manufacturer of the vehicle 510. The computing device 720 may include a temperature monitor 725. The temperature monitor 725 is operative to perform various operations to monitor temperature of one or more compartments of the vehicle 510. The vehicle 510 may include one or more sensors 705 that can be installed by the manufacturer of the vehicle 510 or aftermarket. The sensors 705 are electronic devices operative to record and transmit data through the gateway device 505 towards the management server 540. The vehicle 510 may further include a camera 730, a display device 710, and an audio device 735. The display device 710 and the audio device 735 can be used to present alerts to a driver or passenger of the vehicle 510. In some embodiments, the vehicle 510 includes the electronic device 105, which may be implemented as described above.

Figure 8:
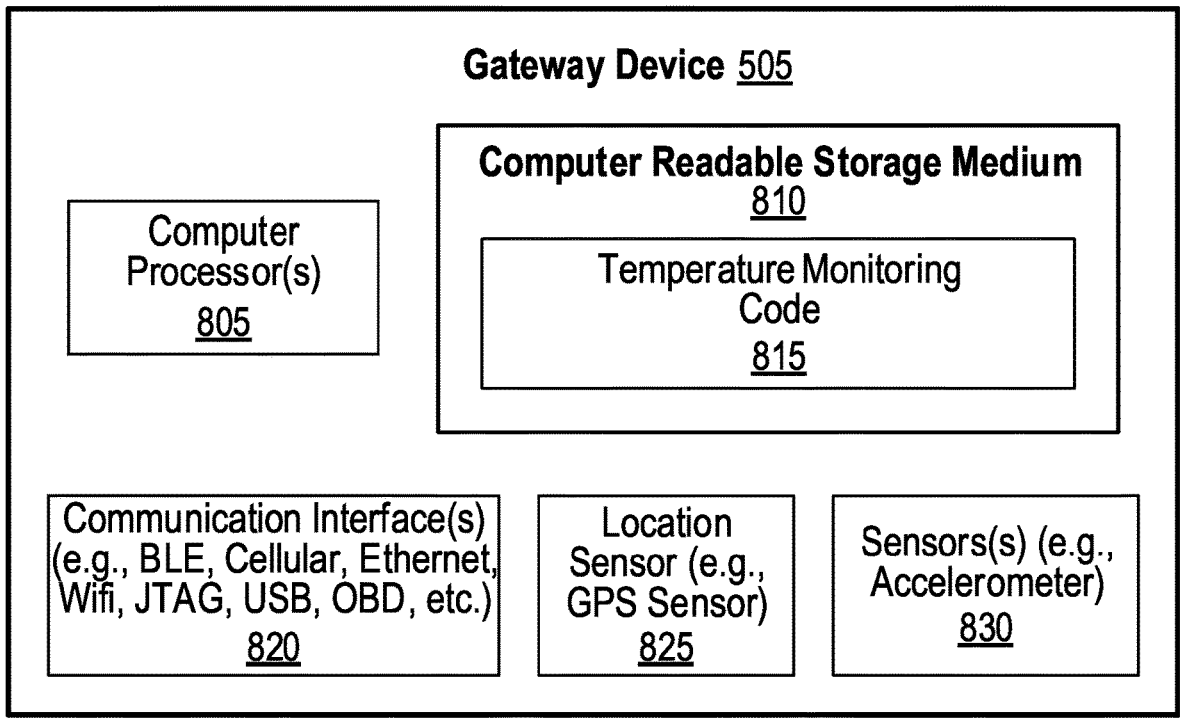
FIG. 8 illustrates a block diagram of an exemplary gateway device, according to one or more embodiments.

FIG. 8 illustrates a block diagram 800 of an exemplary gateway device 505, according to one or more embodiments. The features illustrated in FIG. 8 may be used in conjunction with other embodiments described herein, such as with various embodiments of the electronic device 105.

The gateway device 505 includes one or more computer processors 805 and connected system components (e.g., multiple connected chips). The gateway device 505 includes computer-readable storage medium 810, which is connected to the one or more computer processors 805. The computer-readable storage medium 810 may be used for storing data, metadata, and programs for execution by the one or more computer processors 805. For example, the depicted computer-readable storage medium 810 may store temperature monitoring code 815 that, when executed by the one or more computer processors 805, causes the gateway device 505 to perform operations as discussed above. In some embodiments, the computer-readable storage medium 810 may store code, that when executed by the one or more computer processors 805, causes the gateway device 505 to receive sensor measurements from the electronic device 105 and/or the computing device of the vehicle 510 and transmit the data to the management server 540. The gateway device 505 may further receive data from the management server 540 and is operative to configure the electronic device 105.

The gateway device 505 also includes one or more sensors used to record sensor measurements in response to physical events. For example, the gateway device 505 may include a location sensor (such as a GPS sensor) 825 for recording location measurements to indicate the location of the vehicle 510 on which the gateway device 505 is mounted. The gateway device 505 may include one or more other sensors 830 (e.g., an accelerometer, a temperature sensor, a pressure sensor, etc.).

The devices installed by the manufacturer of the vehicle 510 can be connected with the computing device of the vehicle 510 through a wired or a wireless connection to transmit data. In some embodiments, the gateway device 505 may obtain data based on sensor measurements or image data generated by these devices through the computing device of the vehicle 510 (e.g., through an on-board diagnostics (OBD) port by which the gateway device 505 is coupled to the computing device of the vehicle 510). In other embodiments, the gateway device 505 may be operative to communicate directly with the devices.

The gateway device 505 also includes one or more communication interfaces 820, which are provided to allow a user to provide input to, receive output from, and otherwise transfer data to and from the system. Exemplary input/output devices and communication interfaces 1206 include wired and wireless transceivers, such as a Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G, 5G), or another wireless protocol to connect the gateway device 505 with another device, external component, or a network, and to receive stored instructions, data, tokens, etc. It will be appreciated that one or more buses may be used to interconnect the various components shown in FIG. 8.

It will be appreciated that additional components, not shown, may also be included in the gateway device 505, and in certain embodiments, fewer components than that shown in FIG. 8 may also be used in the gateway device 505.

Figure 9:
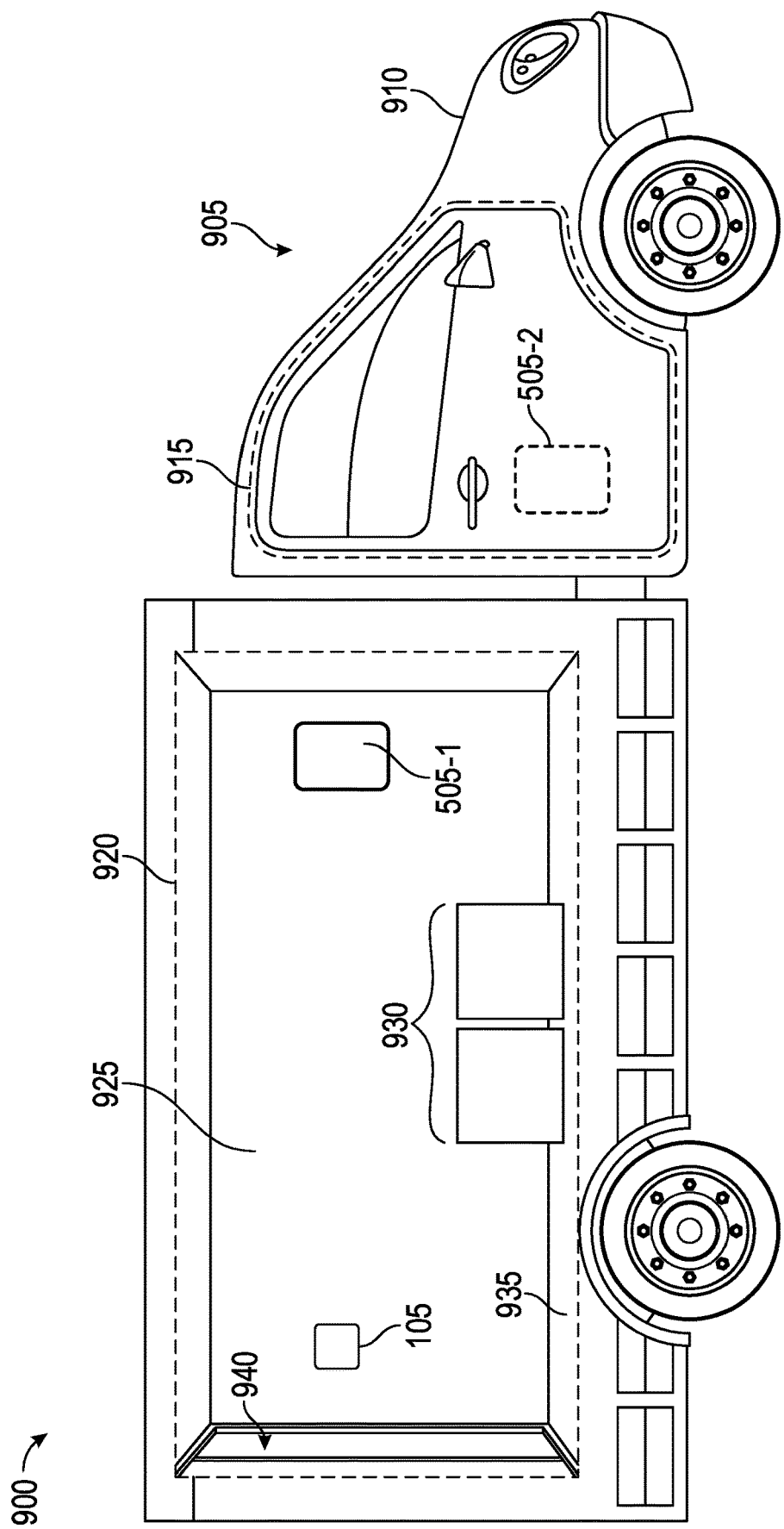
FIG. 9 illustrates deployment of a sensor device and a gateway device in a truck, according to one or more embodiments.

FIG. 9 illustrates deployment of a sensor device and a gateway device in a truck, according to one or more embodiments. The features illustrated in FIG. 9 may be used in conjunction with other embodiments described herein, such as with various embodiments of the electronic device 105.

In diagram 900, the vehicle 510 is implemented as a truck 905 having a cab 910 defining a passenger compartment 915, and a cargo box defining a cargo compartment 920. A wall 925 is defined in the cargo compartment 920, such as a side wall of the cargo box. The electronic device 105 is removably attached to the wall 925 at an end of the wall 925 near rear doors 940 of the cargo box, and a first gateway device 505-1 (representing one instance of the gateway device 505) is attached to the wall 925 at an opposing end. Alternative placements of the electronic device 105 and/or the first gateway device 505-1 are also contemplated. Cargo 930 (illustrated as multiple boxes) is disposed on a floor 935 of the cargo box within the cargo compartment 920.

A second gateway device 505-2 (representing another instance of the gateway device 505) is disposed in the passenger compartment 915. In some embodiments, the electronic device 105 may connect to one of the first gateway device 505-1 and the second gateway device 505-2 using any suitable selection criteria (e.g., based on measuring a relatively greater signal strength, based on the relative capabilities of the gateway devices 505-1, 505-2, and so forth). In some embodiments, the gateway devices 505-1, 505-2 connect with each other, which may provide additional functionality when operating in combination with each other.

Figure 10A:
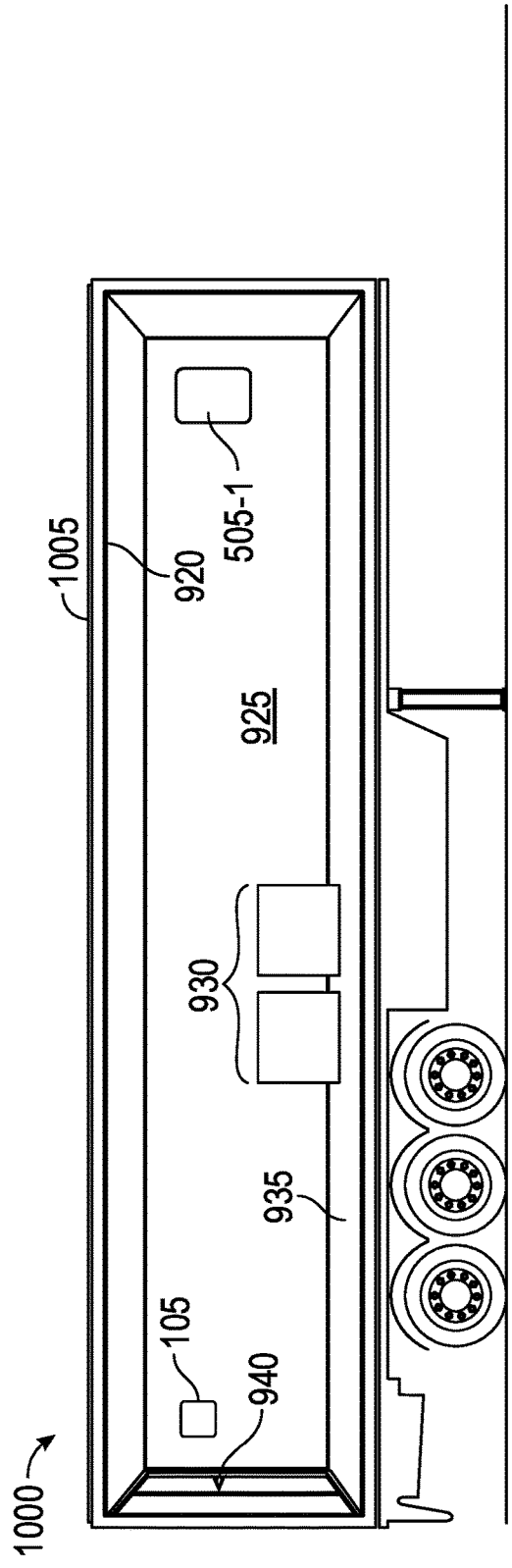
FIG. 10A illustrates deployment of a sensor device and a gateway device in an exemplary unattached trailer, according to one or more embodiments.
Figure 10B:
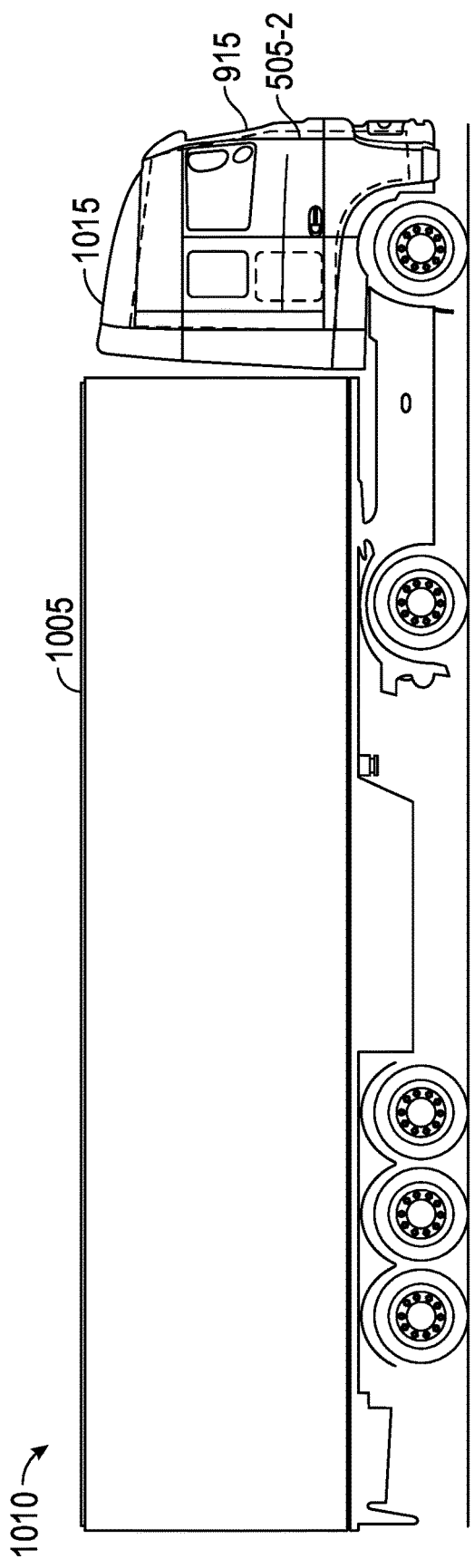
FIG. 10B illustrates attachment of the trailer to a tractor, according to one or more embodiments.

FIG. 10A illustrates deployment of a sensor device 105 and a gateway device 505 in an exemplary unattached trailer 1005, according to one or more embodiments. FIG. 10B illustrates attachment of the trailer 1005 to a tractor 1015 (also referred to as a detachable cab), according to one or more embodiments. The features illustrated in FIGS. 10A, 10B may be used in conjunction with other embodiments described herein, such as with various embodiments of the electronic device 105.

Despite lacking a source of motive force, the trailer 1005 represents one possible implementation of the vehicle 510. In diagram 1000, the trailer 1005 comprises the electronic device 105 and the gateway device 505-1, which are shown in the cargo compartment 920 as being removably attached to the wall 925. The electronic device 105 is connected with the gateway device 505-1 to communicate measurements of one or more environmental parameters (such as temperature measurements) of the cargo compartment 920 to a WAN 530. In this way, while the trailer 1005 is in an unattached configuration (e.g., stationary), the environmental parameters of the cargo compartment 920 may be remotely monitored, e.g., by the management server 540.

In diagram 1010, the trailer 1005 is in an attached configuration with the tractor 1015. The combination of the tractor 1015 and the trailer 1005 represents another possible implementation of the vehicle 510. The tractor 1015 defines the passenger compartment 915, and the second gateway device 505-2 is disposed in the passenger compartment 915. The electronic device 105 is connected with the gateway device 505-1 and/or the gateway device 505-2 to communicate measurements of one or more environmental parameters (such as temperature measurements) of the cargo compartment 920 to a WAN 530. In this way, while the trailer 1005 is in an attached configuration (e.g., during motive operation), the environmental parameters of the cargo compartment 920 may be remotely monitored, e.g., by the management server 540.

CONCLUSION

In the above description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the preceding description and following claims, the term "coupled," along with its derivatives, may be used. "Coupled" is used to indicate that two or more elements, which may or may not be in direct physical or electrical contact with each other, co-operate or interact with each other.

The operations in the flow diagrams are described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams.

While the above description includes several exemplary embodiments, those skilled in the art will recognize that the invention is not limited to the embodiments described and can be practiced with modification and alteration within the spirit and scope of the appended exemplary embodiments. The description is thus illustrative instead of limiting.

What is claimed is:

1. An electronic device to monitor a temperature of an ambient environment, the electronic device comprising:
    an enclosure that defines an internal volume and a plurality of external surfaces, a first external surface of the plurality of external surfaces defining an opening extending therethrough, the enclosure comprising a thermal member exposed to the ambient environment at the opening, the thermal member of a material having a greater thermal conductivity than other portions of the enclosure, the other portions of the enclosure having a greater transmissibility of wireless signals than the thermal member, the plurality of external surfaces and the thermal member disposed such that liquids are prevented from entering the internal volume;
    a first printed circuit board (PCB) assembly disposed in the internal volume, wherein the first PCB assembly comprises one or more computer processors, the one or more computer processors comprising wireless transmitter circuitry, the one or more computer processors to receive electric power from a power source disposed in the internal volume; and
    a second PCB assembly disposed in the internal volume and connected to the first PCB assembly, wherein the second PCB assembly comprises a temperature sensor thermally contacted with the thermal member, and connected with the wireless transmitter circuitry to allow the wireless transmitter circuitry to wirelessly transmit measurements of the temperature of the ambient environment, wherein the second PCB assembly is disposed in the internal volume closer to the first external surface than to a second external surface of the plurality of external surfaces that is opposite the first external surface, wherein the wireless transmitter circuitry is disposed closer to the second external surface than to the first external surface.

2. The electronic device of claim 1, wherein the enclosure further comprises:

a first cover member of a plastic material, the first cover member defining the first external surface and rigidly coupled with the thermal member, the thermal member comprising a metal material; and a second cover member of a plastic material, the second cover member removably attachable to the first cover member to form a sealed interface that seals the internal volume from the ambient environment.

3. The electronic device of claim 2, wherein the first cover member defines a slot in a first plane parallel with a second plane of the first external surface, wherein the thermal member is disposed in the slot and is recessed from the first external surface.

4. The electronic device of claim 2, wherein substantially all of a first surface of the thermal member is exposed to the ambient environment, and substantially all of an opposing second surface of the thermal member is exposed to the internal volume.

5. The electronic device of claim 2, wherein the first external surface comprises a side surface of the enclosure.

6. The electronic device of claim 5, wherein the enclosure further comprises:

a connector interface at a bottom surface of the enclosure that extends to the side surface, the connector interface to connect the one or more computer processors with an external temperature sensor.

7. The electronic device of claim 5, wherein the first cover member defines a first internal surface opposite the first external surface, wherein the first PCB assembly is mounted to the first internal surface.

8. The electronic device of claim 1, wherein the first PCB assembly and the second PCB assembly are connected by a flexible PCB.

9. The electronic device of claim 1, wherein the first PCB assembly and the second PCB assembly are connected at a first end of the first PCB assembly nearest a side surface of the enclosure, and wherein the wireless transmitter circuitry is disposed near a second end of the first PCB assembly opposite the first end.

10. The electronic device of claim 2, wherein the second cover member defines a rear surface of the enclosure and an attachment interface at the rear surface, the attachment interface to removably attach to a wall within the ambient environment.

11. The electronic device of claim 10, wherein a second external surface of the plurality of external surfaces comprises a front surface of the enclosure opposite the rear surface, the electronic device further comprising:

one or more computer processors disposed in the internal volume and connected to the temperature sensor; and a display device viewable at the front surface of the enclosure and connected to the one or more computer processors.

12. The electronic device of claim 11, further comprising:

an input device disposed at the front surface and connected to the one or more computer processors.

13. A vehicle-borne system comprising:

a gateway device to connect with a Wide Area Network; and a sensor device disposed in a compartment of the vehicle to be monitored, the sensor device comprising:

an enclosure that defines an internal volume and a plurality of external surfaces, a first external surface of the plurality of external surfaces defining an opening extending therethrough, the enclosure comprising a thermal member exposed to an ambient environment of the compartment at the opening, the thermal member of a material having a greater thermal conductivity than other portions of the enclosure, the other portions of the enclosure having a greater transmissibility of wireless signals than the thermal member, the plurality of external surfaces and the thermal member disposed such that liquids are prevented from entering the internal volume;

a first printed circuit board (PCB) assembly disposed in the internal volume, wherein the first PCB assembly comprises one or more computer processors, the one or more computer processors comprising wireless transceiver circuitry to wirelessly couple to the gateway device, the one or more computer processors to receive electric power from a power source disposed in the internal volume; and a second PCB assembly disposed in the internal volume and connected to the first PCB assembly, wherein the second PCB assembly comprises a temperature sensor thermally contacted with the thermal member, and connected with the wireless transceiver circuitry to wirelessly transmit measurements of a temperature of the ambient environment to the gateway device, wherein the second PCB assembly is disposed in the internal volume closer to the first external surface than to a second external surface of the plurality of external surfaces that is opposite the first external surface, wherein the wireless transceiver circuitry is disposed closer to the second external surface than to the first external surface.

14. The system of claim 13, wherein the gateway device and the sensor device are disposed in a cargo compartment of the vehicle.

15. The system of claim 14, wherein the vehicle comprises a cab that is detachably connected to a trailer defining the cargo compartment, the system further comprising:

a second gateway device disposed in the cab, the second gateway device to couple with one or both of the first gateway device and the sensor device.

16. The system of claim 13, wherein the enclosure further comprises:

a first cover member of a plastic material, the first cover member defining the first external surface and rigidly coupled with the thermal member, the thermal member comprising a metal material; and a second cover member of a plastic material, the second cover member removably attachable to the first cover member to form a sealed interface that seals the internal volume from the ambient environment.

17. The system of claim 16, wherein the first external surface comprises a side surface of the enclosure.

18. The system of claim 17, wherein the enclosure further comprises:

a connector interface at a bottom surface of the enclosure that extends to the side surface, the connector interface to connect the one or more computer processors with an external temperature sensor.

19. The system of claim 16, wherein the second cover member defines a rear surface of the enclosure and an attachment interface at the rear surface, the attachment interface to removably attach to a wall within the compartment.

20. The system of claim 19, wherein a second external surface of the plurality of external surfaces comprises a front surface of the enclosure opposite the rear surface, the sensor device further comprising:

one or more computer processors disposed in the internal volume and connected to the temperature sensor; and a display device viewable at the front surface of the enclosure and connected to the one or more computer processors.

\* \* \* \* \*